(12) United States Patent
Ikami et al.

(10) Patent No.: US 7,058,722 B2
(45) Date of Patent: Jun. 6, 2006

(54) METHOD AND APPARATUS FOR SPLIT DOWNLOAD

(75) Inventors: Yukihito Ikami, Kounan (JP); Kazuoki Matsugatani, Kariya (JP)

(73) Assignee: Denso Corporation, Kariya (JP)

( * ) Notice: Subject to any disclaimer, the term of this patent is extended or adjusted under 35 U.S.C. 154(b) by 776 days.

(21) Appl. No.: 10/000,041

(22) Filed: Oct. 29, 2001

(65) Prior Publication Data

US 2002/0059400 A1    May 16, 2002

(30) Foreign Application Priority Data

Oct. 30, 2000   (JP)   ............................. 2000-330889

(51) Int. Cl.
*G06F 15/16*  (2006.01)
(52) U.S. Cl. ...................... 709/231; 709/213; 709/218; 709/232
(58) Field of Classification Search ................ 709/219, 709/203, 213, 231, 218
See application file for complete search history.

(56) References Cited

U.S. PATENT DOCUMENTS 5,623,603 A * 4/1997 Jiang et al. ................. 709/207
6,070,191 A * 5/2000 Narendran et al. ......... 709/226
6,339,785 B1 * 1/2002 Feigenbaum ................ 709/213
6,374,336 B1 * 4/2002 Peters et al. ................ 711/167

FOREIGN PATENT DOCUMENTS

JP    7-30573    1/1995

* cited by examiner

*Primary Examiner*—Rupal Dharia
*Assistant Examiner*—Djenane Bayard
(74) *Attorney, Agent, or Firm*—Harness, Dickey & Pierce, PLC

(57) ABSTRACT

A download method forms a download user network with a plurality of user terminals which are going to download the same data. The delivery server divides the data into data portions, and assigns the data portions to the respective user terminals belonging to the download user network. Then each of the user terminals downloads the assigned data portion from the delivery server. Thereafter the downloaded data portions are mutually transmitted among the user terminals within the download user network so that each of the user terminals can obtain all the data portions which constitute the data. Each of the user terminals combines the obtained data portions into the original data. Thus the data is efficiently downloaded to the plurality of user terminals.

14 Claims, 11 Drawing Sheets

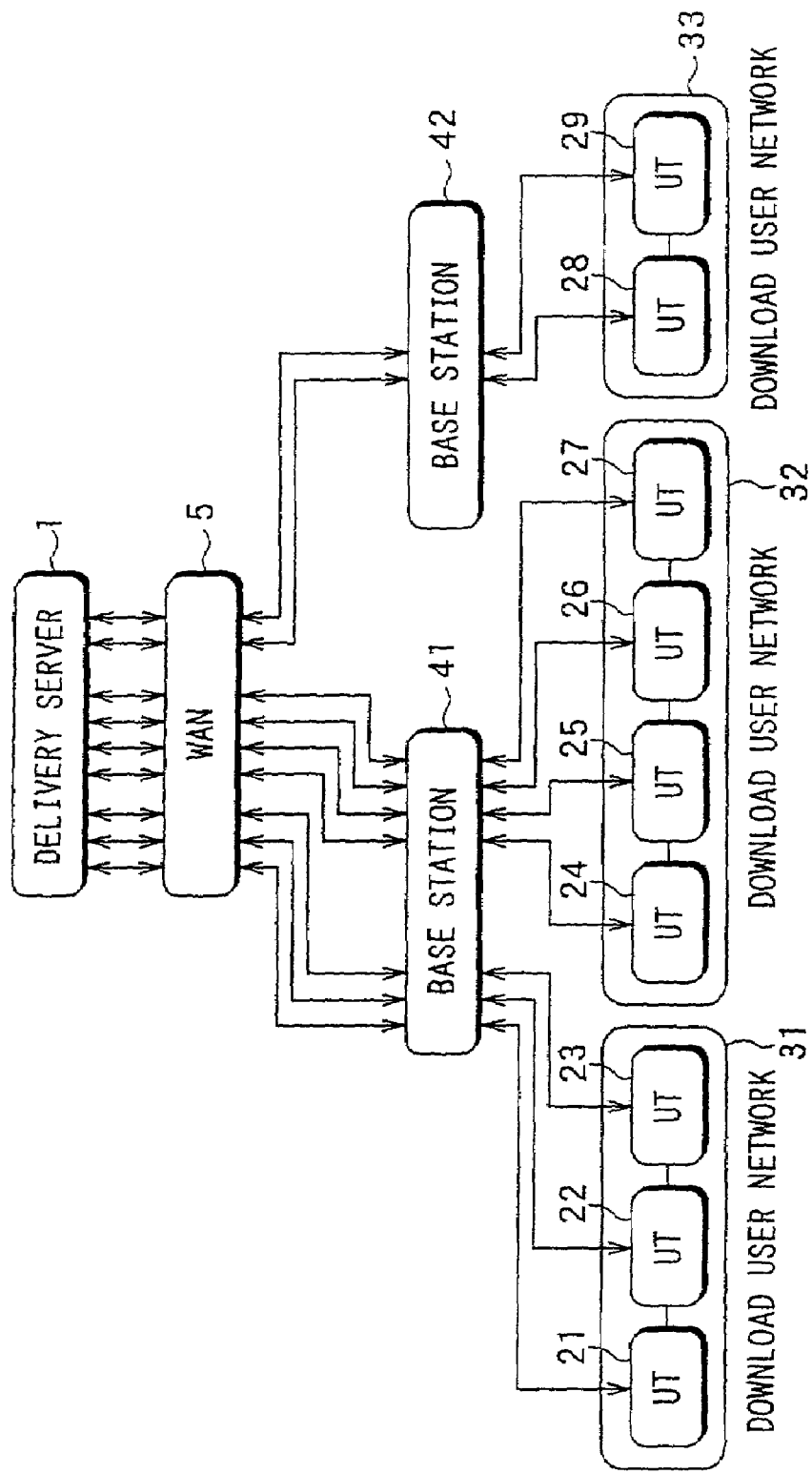

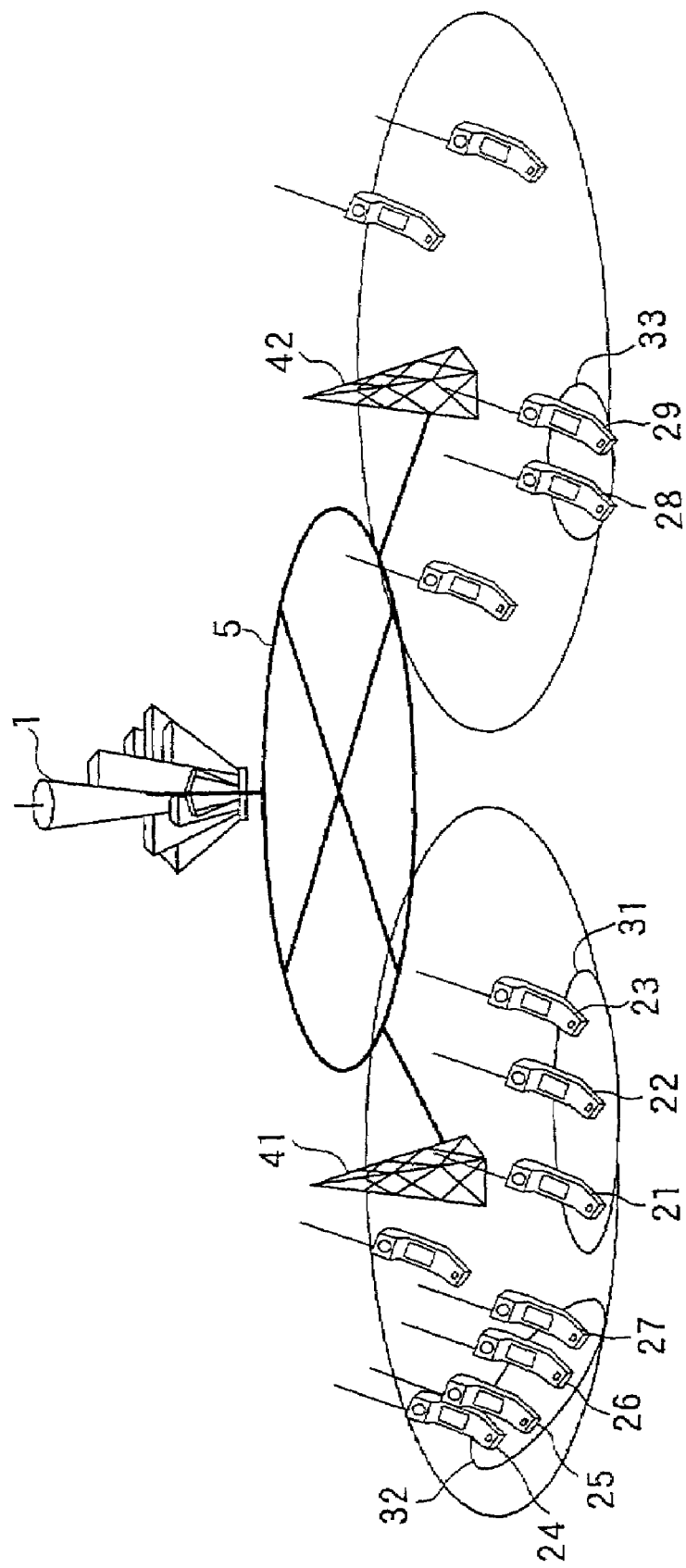

FIG. 6

ONE-TO-ONE MUTUAL TRANSMISSION

| UT: | A | B | C | D | E | F |
|---|---|---|---|---|---|---|
| DOWNLOADED DATA FRAGMENTS: | a | b | c | d | e | f |
| RESULT OF FIRST STAGE: | ab | ab | cd | cd | ef | ef |
| RESULT OF SECOND STAGE: | abcd | abef | abcd | cdef | abef | cdef |
| RESULT OF FINAL STAGE: | abcdef | abcdef | abcdef | abcdef | abcdef | abcdef |

FIG. 9

ONE-TO-MULTIPLE MUTUAL TRANSMISSION

| UT: | A | B | C | D | E | F |
|---|---|---|---|---|---|---|
| DOWNLOADED DATA FRAGMENTS: | a | b | c | d | e | f |
| RESULT OF FIRST STAGE: | ab | ab | ac | ad | ae | af |
| RESULT OF SECOND STAGE: | abc | abc | abc | abd | abe | abf |
| RESULT OF THIRD STAGE: | abcd | abcd | abcd | abcd | abce | abcf |
| RESULT OF FOURTH STAGE: | abcde | abcde | abcde | abcde | abcde | abcdf |
| RESULT OF FIFTH STAGE: | abcdef | abcde | abcde | abcde | abcde | abcdef |
| RESULT OF FINAL STAGE: | abcdef | abcdef | abcdef | abcdef | abcdef | abcdef |

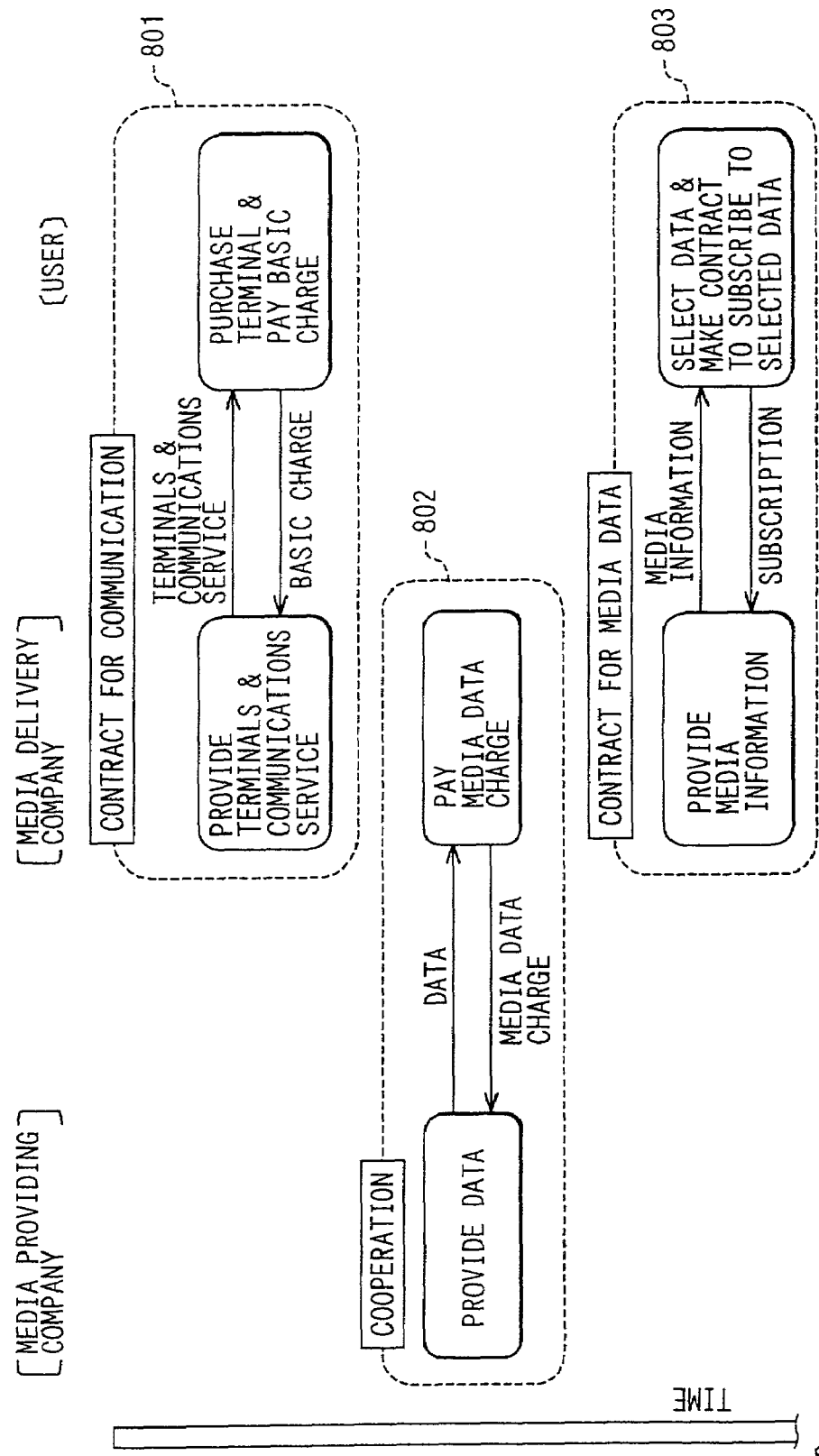

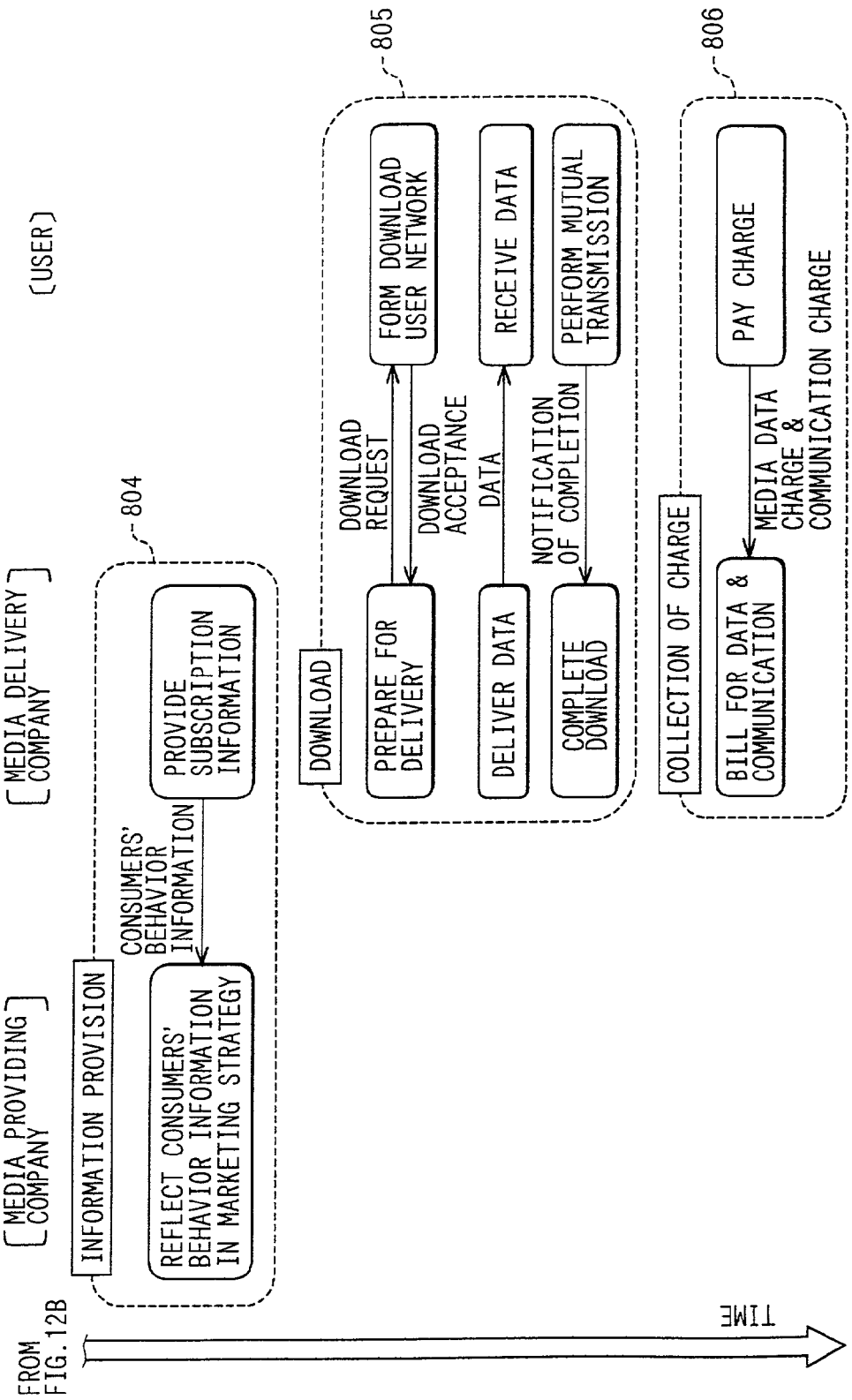

METHOD AND APPARATUS FOR SPLIT DOWNLOAD

CROSS REFERENCE TO RELATED APPLICATION

The present application is based on and incorporates herein by reference Japanese Patent Application No. 2000-330889 filed on Oct. 30, 2000.

BACKGROUND OF THE INVENTION

1. Field of the Invention

The present invention relates to a download method, and a user terminal and a delivery server therefor.

2. Related Art

JP-A-H7-30573 proposes a download method for downloading the same data to all slave stations (user terminals). The method first sends a download request including a data identifier from a master station (sender) to slave stations which are directly connected to the master station. Each of the slave stations which have received the download request determines whether to accept or reject the download request based on the data identifier. The master station sends the data corresponding to the data identifier to the slave stations which have accepted the download request. Each of the slave stations which have received the data sends the received data in turn to slave stations which are connected thereto. This process is repeated, so that the same data is downloaded to all the slave stations.

This method downloads the data from the master station to the slave stations which are directly connected thereto via a wide area network (WAN), and sends the data to the rest of the slave stations via a local area network (LAN) in parallel. Therefore the total time required for downloading the same data to all the slave stations is reduced in comparison with a conventional method which downloads the data from a master station directly to all slave stations.

However, according to JP-A-H7-30573, the master station sends the entire data to each of the slave stations directly connected thereto. Therefore a relatively large amount of data is sent via the WAN. That is, it still takes a relatively long time to download the same data to all the slave stations.

SUMMARY OF THE INVENTION

It is an object of the present invention to provide a download method which efficiently downloads the same data to a plurality of user terminals.

It is also an object of the present invention to provide a user terminal and a delivery server for implementing the download method.

A download method according to the present invention forms a download user network with a plurality of user terminals which are going to download the same data. A delivery server divides the data into data portions, and assigns the data portions to the respective user terminals belonging to the download user network. Then each of the user terminals downloads the assigned data portion from the delivery server. Thereafter the downloaded data portions are mutually transmitted among the user terminals within the download user network so that each of the user terminals can obtain all the data portions which constitute the data.

Alternatively, one of the user terminals belonging to the download user network may download the entire data from the delivery server and transmit the downloaded data to each of the other user terminals.

BRIEF DESCRIPTION OF THE DRAWINGS

The above and other objects, features and advantages of the present invention will become more apparent from the following detailed description made with reference to the accompanying drawings. In the drawings FIG. 1 is a block diagram showing a download system for implementing a download method according to an embodiment of the present invention;

FIG. 2 is a pictorial diagram showing the download system of FIG. 1;

FIG. 6 is a schematic diagram showing the procedure of one-to-one mutual transmission executed among user terminals;

FIG. 9 is a schematic diagram showing the procedure of one-to-multiple mutual transmission executed among the user terminals;

FIGS. 12A and 12B are flowcharts of the first half and the second half of the media data download method implemented by the media data download system of FIG. 10, respectively.

DETAILED DESCRIPTION OF THE PREFERRED EMBODIMENT

Referring to FIGS. 1 and 2, a download system for implementing a download method according to the present invention includes a delivery server 1 owned by a service provider, base stations 41, 42, and user terminals (UT) 21–29 such as mobile phones. The user terminals 21–29 can perform radio telecommunication with the delivery server 1 via the base stations 41, 42 and a wide area network (WAN) 5.

Further each of the user terminals 21–29 can form a download user network 31–33, which is other than the WAN 5, with other user terminals 21–29 within a cell for local radio communication. The download user network 31 is an ad hoc decentralized autonomous network formed with a plurality of user terminals among which high-speed local radio communication can be performed via a wireless LAN.

The download system downloads the same data (e.g., broadcast information) from the delivery server 1 to some of the user terminals 21–29 as follows. Users each purchase a terminal and make a contract with the service provider for communications service beforehand. The ID (the unique number or address) of the user terminal 21–29 is registered with the delivery server 1 at the time of the contract. The service provider informs the users of the contents and time of the service to be provided and the charge for the service from the delivery server 1 via the WAN 5 or by other information providing means. The users each select information to be downloaded, and register with the delivery server 1 as a subscriber to the selected information.

Figure 3A:
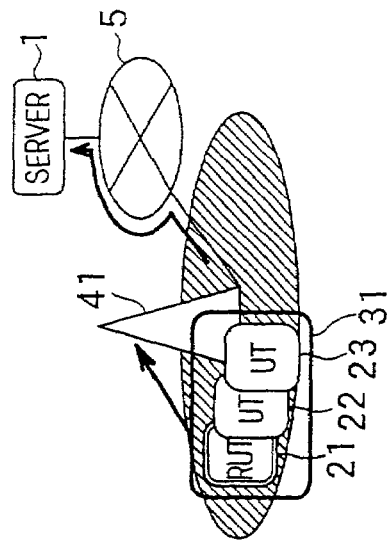
FIGS. 3A–3F are schematic diagrams showing the procedure of the download method implemented by the download system of FIG. 1.
Figure 4:
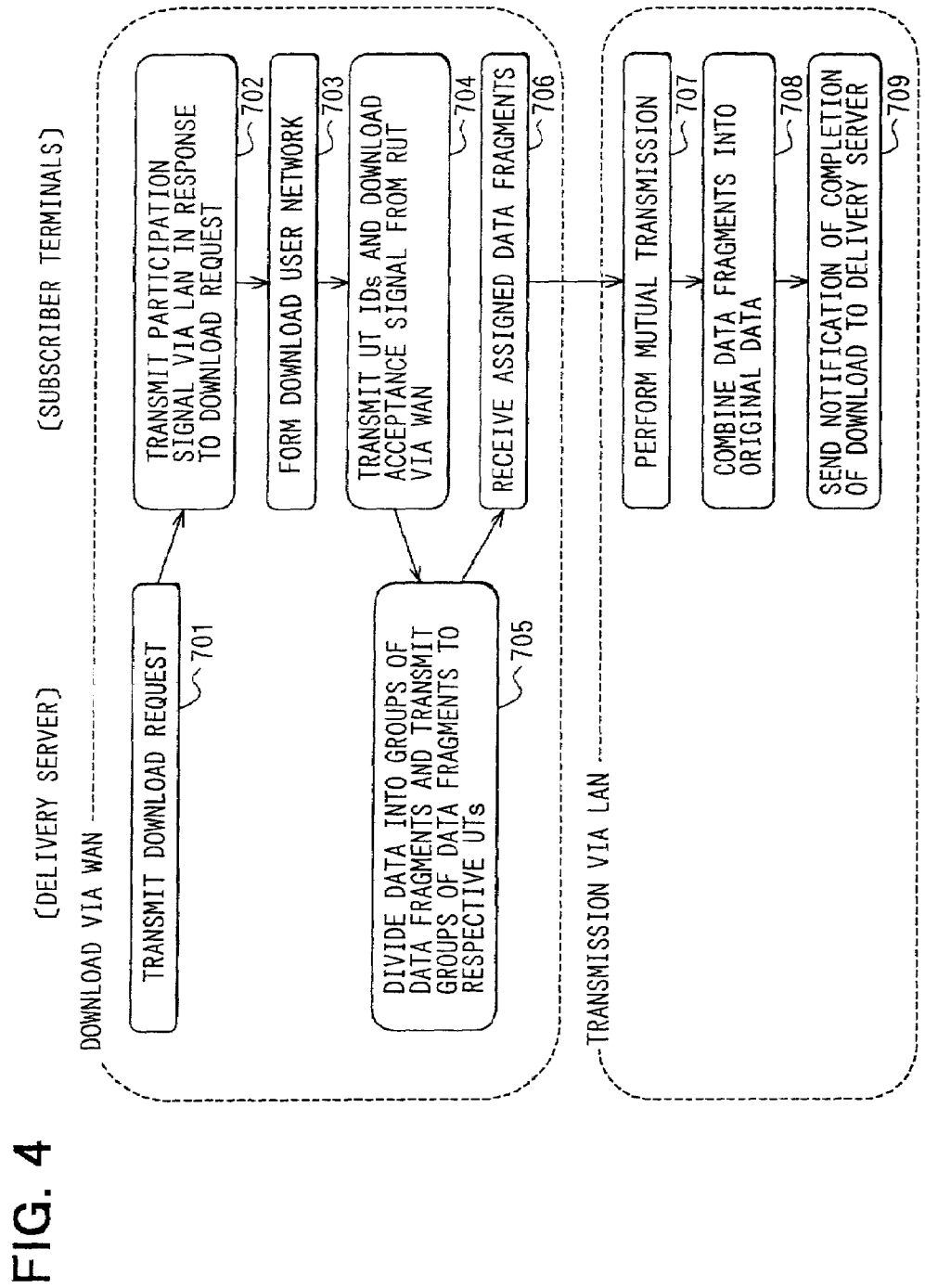
FIG. 4 is a flowchart of the download method implemented by the download system of FIG. 1.

Referring to FIG. 4, at step 701, the delivery server 1 transmits a start signal (download request) to the user terminals (subscriber terminals) 21–29 registered as subscribers to data via the WAN 5 and base stations 41, 42 at a time to start delivering the data as shown in FIG. 3A.

Each of the subscriber terminals 21–29 receives the download request at step 702, and notifies other user terminals 21–29 that it is going to download the data. This notification is transmitted using carrier sense multiple access technique via the wireless LAN within the cell for local radio communication. Specifically, the subscriber terminals 21–29 each transmit, at random timing, a signal (participation signal) including its terminal ID and information that it is going to download the data. The user terminals 21–29 in the local communication cell receive the participation signals from the subscriber terminals 21–29 at random timing. Thus the subscriber terminals 21–29 each search for other subscriber terminals 21–29 within the local communication cell.

Figure 3B:
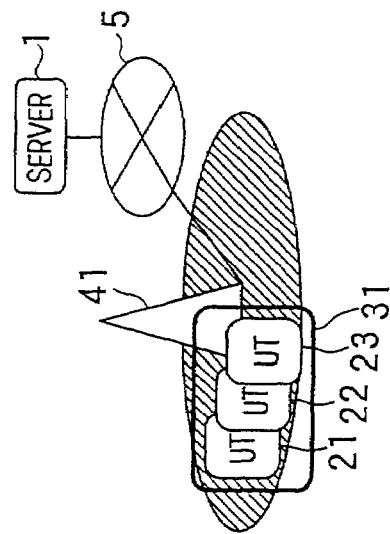

When a predetermined time elapses from the beginning of the transmission of the participation signals, the participation list is closed. Then the subscriber terminals 21–29 each obtain information including the number of the subscriber terminals 21–29 which are going to download the same data and the IDs of such subscriber terminals 21–29. At step 703, based on the obtained information, the subscriber terminals 21–29, which are going to download the same data and included in the same local communication cell, form a download user network 31–33 as shown in FIG. 3B.

Thus, a plurality of download user networks 31–33 are formed as shown in FIG. 1 or 2. However FIGS. 3A–3F show only one download user network 31 as an example, and therefore the operation of the present system will be hereinafter explained only about the example. The user terminals 24–29 belonging to the other download user networks 32, 33 operate similarly to the user terminals 21–23 belonging to the download user network 31, and the delivery server 1 also executes the similar processes for the other download user networks 32, 33.

Each of the user terminals 21–23 includes software for managing its operation in the download user network 31, because the download user network 31 does not include a base station which controls the communication among the user terminals 21–23 in the download user network 31.

Figure 3C:
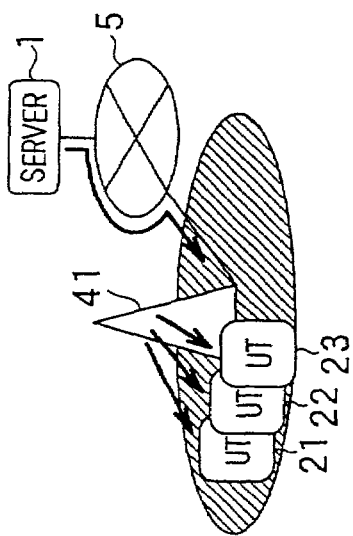

One of the user terminals 21–23 belonging to the download user network 31 is arbitrarily selected as a representative user terminal (virtual administrator). For example, the user terminal 21 is selected as the representative user terminal (RUT) as shown in FIG. 3C. At step 704, the representative user terminal 21 transmits the IDs of the user terminals 21–23 belonging to the download user network 31 with a download acceptance signal to the delivery server 1 via the base station 41 and the WAN 5 as shown in FIG. 3C.

At step 705, the delivery server 1 obtains the number of the user terminals 21–23 belonging to the download user networks 31 from the user terminal IDs received from the representative user terminals 21. Then the delivery server 1 divides the data to be delivered among the user terminals 21–23 belonging to the download user networks 31.

Figure 5A:
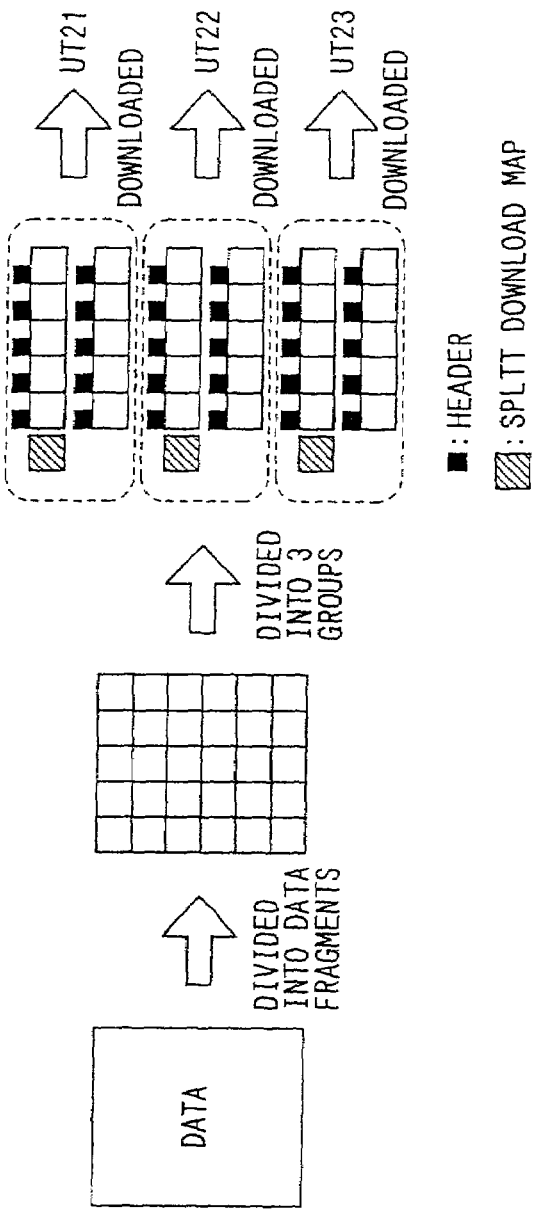
FIG. 5A is a schematic diagram showing a data split process executed by a delivery server.

Specifically, referring to FIG. 5A, the delivery server 1 divides the data into a predetermined number of fragments beforehand, and attaches a header to each of the fragments. The header includes data identification information, information (serial number) on the position of the fragment in the entire data, and error detecting code (CRC or the like). The predetermined number is set to a positive integer (e.g., 60) which is divisible by relatively many integers. When the number of the user terminals belonging to the download user network is '4' for example, fifteen data fragments are transmitted to each of the user terminals.

Figure 5B:
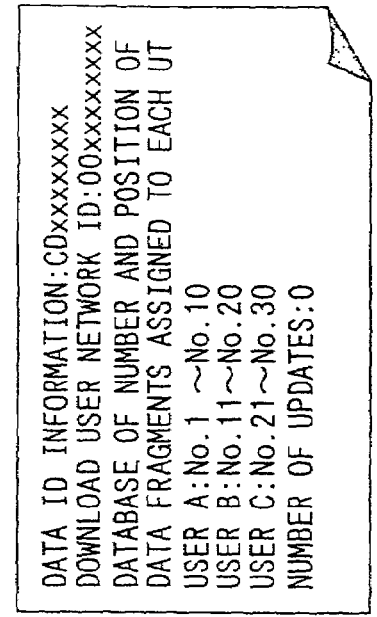
FIG. 5B is a diagram showing the content of a split download map attached to each group of data fragments in the data split process.

In FIG. 5A, assuming that the data is divided among three user terminals 21–23 of the download user network 31, the data fragments are divided into three groups. Then a split download map is attached to each of the groups. The split download map includes data identification information, the identifier of the download user network, a database including data on the number and position of the data fragments assigned to the respective user terminal (that is, the serial numbers of the data fragments assigned to the respective user terminal), the number of updates of the split download map, and error detecting code (CRC or the like) as shown in FIG. 5B.

Figure 3D:
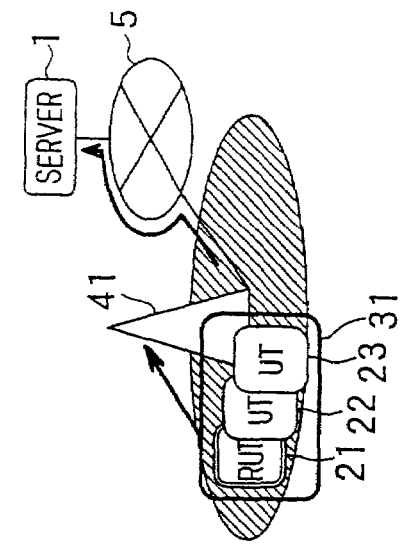

The groups of the data fragments are transmitted to the respective user terminals 21–23 via the WAN 5 as shown in FIG. 3D. The user terminals 21–23 each receive the assigned data fragments at step 706, and verify the received data fragments based on the error detecting codes. When an error is detected, the user terminal 21–23 requests the delivery server 1 to retransmit the assigned data fragments.

If another user terminal newly joins the download user network 31 after the download acceptance signal is transmitted, the representative user terminal 21 notifies the delivery server 1 of the new user terminal. Then the delivery server 1 dynamically changes the number of the data fragments assigned to each of the user terminals so that the data fragments are also assigned to the new user terminal. Then the newly assigned data fragments are transmitted to each of the user terminals 21–23.

If one of the user terminals belonging to the download user network 31 is disconnected from the delivery server 1, the delivery server 1 detects the disconnection or the representative user terminal 21 notifies the delivery server 1 of the disconnection. Then the delivery server 1 dynamically changes the number of the data fragments assigned to each of the user terminal so that no data fragment is assigned to the disconnected user terminal. Then the newly assigned data fragments are transmitted to each of the user terminals 21–23.

Figure 3E:
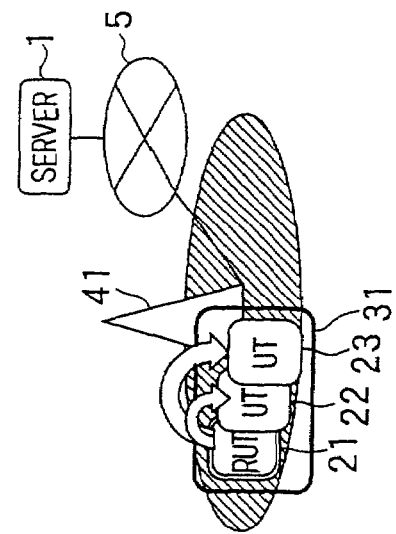

The representative user terminal 21 checks whether all the user terminals 21–23 belonging to the download user network 31 have already downloaded the assigned data fragments. When the representative user terminal 21 determines that all the user terminals 21–23 have already downloaded the assigned data fragments, it plans mutual transmission among the user terminals 21–23, and instructs the user terminals 22,23 to start one-to-one mutual transmission within the download user network 31 as shown in FIG. 3E at step 707.

Referring to FIG. 6, assuming that the six user terminals A–F have downloaded the respective group a–f of the data fragments, the one-to-one mutual transmission is performed as follows. At the first stage, the user terminals A, B exchange the data fragments 'a', 'b', the user terminals C, D exchange the data fragments 'c', 'd', and the user terminals E, F exchange the data fragments 'e', 'f'. The split download maps of the user terminals A–F are updated so that the data exchange at the first stage is reflected.

At the second stage, based on the updated split download maps, the user terminals A, C exchange the data fragments 'ab', 'cd', the user terminals B, E exchange the data fragments 'ab', 'ef', and the user terminals D, F exchange the data fragments 'cd', 'ef'. The split download maps of the user terminals A–F are updated so that the data exchange at the second stage is reflected.

At the final stage, based on the updated split download maps, the user terminals A, F exchange the data fragments 'ab', 'ef' except the overlapping data fragments 'cd', the user terminals B, C exchange the data fragments 'ef', 'cd' except the overlapping data fragments 'ab', and the user terminals D, E exchange the data fragments 'cd', 'ab' except the overlapping data fragments 'ef'. Thus all the user terminals A–F obtain the entire data 'abcdef'.

The user terminals, which are at a relatively long distance from one another within the download user network, sometimes cannot communicate with one another via the wireless LAN. In the case that the mutual transmission should be performed between such user terminals, the user terminals each obtain the required data fragments from a nearer user terminal, which has the required data fragments, instead. Further, the user terminal, which has been disconnected from the delivery server 1, can obtain the data from the other user terminals during the mutual transmission.

The download user network is omnidirectionally established, and therefore any user terminal can omnidirectionally communicate with all the other user terminals within the download user network. Accordingly, the data exchange between one pair of the user terminals should be performed at a time, and thereafter the data exchange between another pair of the user terminals should be performed after a predetermined interval at each stage of the mutual transmission. Thus the data exchange between each pair of the user terminals is performed without interference with signals from other user terminals. In this case, the mutual transmission shown in FIG. 6 is accomplished by performing the communication between a pair of the user terminals A–F nine (3 pairs×3 stages) times.

If the download user network includes a mechanism for directional control of communication among the user terminals, any user terminal can directionally communicate with one of the other user terminals at a time although the download user network is omnidirectionally established. In this case, because the communication can be simultaneously performed between disjoint pairs of the user terminals, the mutual transmission shown in FIG. 6 is accomplished by performing the simultaneous communication between three pairs of user terminals A–F only three times. However, the complicated mechanism for directional control of the communication is required, and further time for executing processes for the directional control is also required.

The split download maps of a pair of the user terminals A–F are updated immediately after the data exchange between the pair is completed. Therefore the contents of the split download maps of the user terminals A–F are not consistent with one another in the middle of each stage of the mutual transmission. In order to keep the split download maps consistent at all times, communication specially for updating the split download maps should be performed whenever the data exchange between a pair of the user terminals A–F is completed.

When each of the user terminals 21–23 belonging to the download user network 31 obtains all the data fragments by the mutual transmission, it combines the obtained data fragments referring to the headers attached thereto at step 708. When the data fragments are combined into the original data, the user terminal 21–23 transmits a notification of completion of the mutual transmission to the representative user terminal.

Figure 3F:
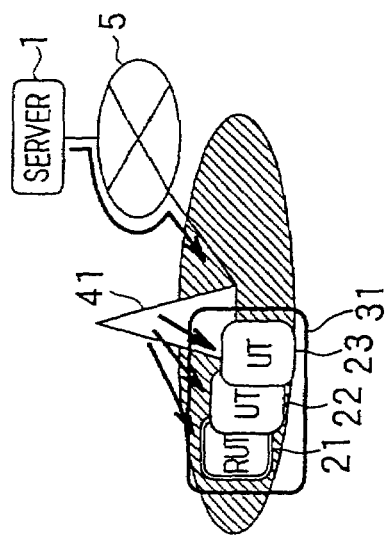

When the representative user terminal 21 receives the notifications of completion of the mutual transmission from all the user terminals 21–23 belonging to the download user network 31, it transmits a notification of completion of the download to the delivery server 1 as shown in FIG. 3F and dissolves the download user network 31 at step 709. When the delivery server 1 receives the notification of completion of the download from all the representative user terminals, that is, from all the download user networks 31–33, the download of the data from the delivery server 1 to the plurality of the user terminals 21–29 is completed.

Figure 7:
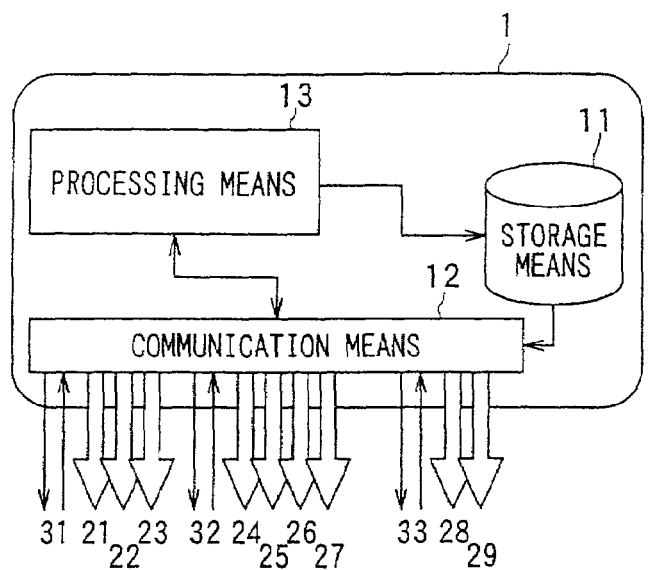
FIG. 7 is a block diagram showing the construction of the delivery server.

The construction of the delivery server 1 is as follows. Referring to FIG. 7, the delivery server 1 is formed with a computer and includes storage means 11 for storing various data such as data to be delivered, communication means 12 for communicating with the user terminals 21–29 via the WAN 5, and processing means 13 for executing a program which is stored beforehand and implements various processes required for delivering the data.

The processing means 13 includes, for example, means for dividing the data to be delivered into data fragments and attaching a header to each of the data fragments, means for instructing the communication means 12 to transmit the download request, means for assigning the data fragments to the user terminals according to the number of the user terminals belonging to the download user network, means for instructing the communication means 12 to transmit the assigned data fragments to the user terminals, means for dynamically changing the number of the data fragments assigned to each of the user terminals in response to change of the number of the user terminals belonging to the download user network or existence of a user terminal disconnected from the delivery server 1, and means for removing the delivered data from the storage means 11 in response to the notification of completion of the download.

Figure 8:
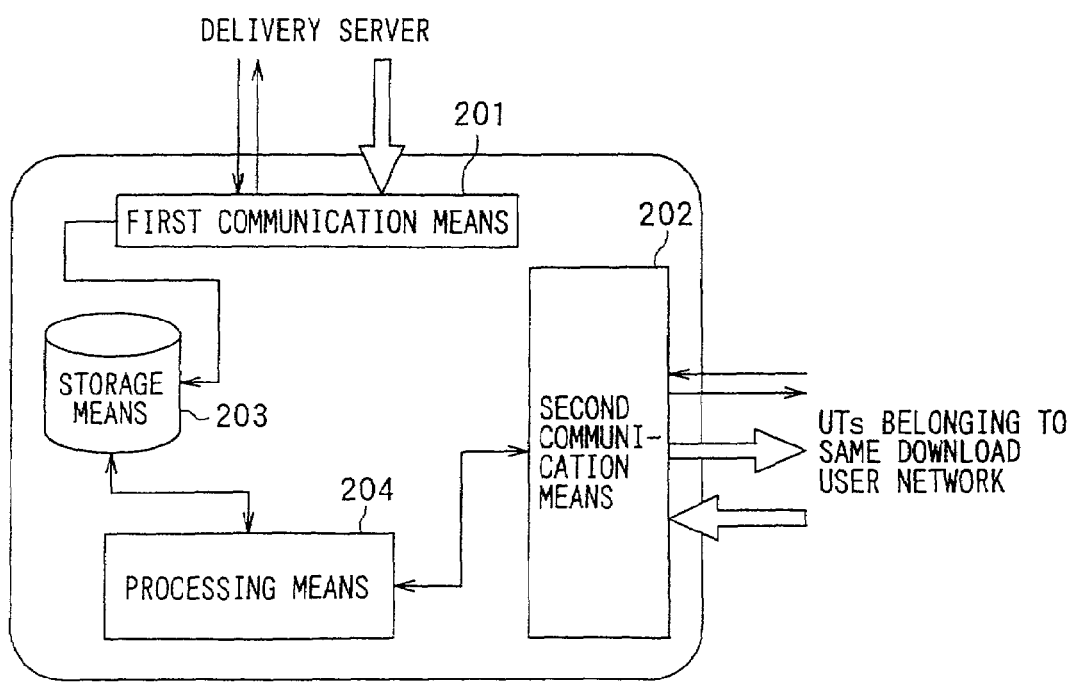
FIG. 8 is a block diagram showing the construction of each of the user terminals.

The construction of each of the user terminals 21–29 is as follows. Referring to FIG. 8, each of the user terminals 21–29 is formed with a computer and includes first communication means 201 for communicating with the delivery server 1 via the WAN 5, second communication means 202 for communicating with other user terminals 21–29 at a high transmission rate via the wireless LAN, storage means 203 for storing downloaded data, and processing means 204 for executing a program which is stored beforehand and implements various processes required for downloading data.

The processing means 204 includes, for example, means for controlling the operation of the user terminal in the download network, means for instructing the second communication means 202 to transmit the participation signal for participating in the download user network, means for exchanging various information with the delivery server 1 when the user terminal is selected as the representative user terminal, means for performing the mutual transmission with other user terminals, and means for combining the obtained data fragments into the original data.

In the present embodiment, the total amount of the data transmitted to each of the local communication cells via the WAN 5 is reduced to the same amount as the entire data. The mutual transmission via the LAN compensates for the reduction in the amount of the data transmitted via the WAN 5. Therefore the data is efficiently downloaded to the plurality of user terminals.

(Modifications)

In the above embodiment, at step 702, each of the user terminals 21–23 which have received the download request from the delivery server 1 may attach information (e.g., received power) on how well the user terminal 21–23 can communicate with the delivery server 1 via the WAN 5 to the participation signal. Then the user terminal which can communicate with the delivery server 1 best may be selected as the representative user terminal.

Further in this case, the representative user terminal 21 may attach the information on how well each of the user terminals 21–23 can communicate with the delivery server 1 via the WAN 5 to the download acceptance signal at step 704. Then the delivery server 1 may assign the different number of the data fragments to each of the user terminals based on the information at step 705 so that the download of the data is prevented from being prolonged. Moreover, at step 705, the delivery server 1 may assign the data fragments to the respective user terminals 21–23 based on the information so that the assigned data fragments overlap each other.

Further in the above embodiment, the download user network 31 may be formed beforehand with the user terminals 21–23 which are going to download the same data. That is, step 701 may be omitted and steps 702, 703 may be modified and executed beforehand as follows. Each of the user terminals 21–23 transmits the participation signal within the local communication cell, when it registers with the delivery server 1 as a subscriber to the data. The participation list is closed at some point of time and the download user network 31 is formed with the user terminals 21–23 in the participation list. Further the representative user terminal 21 is selected. Thereafter a new user terminal may join the download user network 31 by transmitting the participation signal.

In this case, step 704 is performed at a time to start downloading the data as follows. The representative user terminal 21 transmits a start signal (download request) with the IDs of all the user terminals 21–23 belonging to the download user network 31 to the delivery server 1 via the WAN 5. That is, the download request is transmitted from the representative user terminal 21 to the delivery server 1 in this case, while it is transmitted from the delivery server 1 to the user terminals 21–23 in the above embodiment.

Further in the above embodiment, at step 705, the delivery server 1 may directly divide the entire data according to the number of the user terminals 21–23 belonging to the download network 31 without dividing the entire data into the predetermined number of the data fragments beforehand. In this case, although the data should be divided immediately before the data fragments are transmitted to the user terminals 21–23, the data can be evenly assigned to each of the user terminals 21–23 belonging to the download user network 31.

In the above embodiment, steps 705–707 may be modified as follows. The delivery server 1 transmits the entire data to the representative user terminal 21 without dividing the data. Then the representative user terminal 21 receives the entire data via the WAN 5, and transmits the received entire data to each of the user terminals 21–23 belonging to the download network 31. Step 708 is bypassed in this case. In the present modification, the total amount of the data transmitted to each of the local communication cells via the WAN 5 is also reduced to the same amount as the entire data. Therefore the data is efficiently downloaded to the plurality of user terminals.

During the download of the entire data from delivery server 1, the representative user terminal 21 may sequentially extract a data fragment from an already downloaded portion of the data and transmit the data fragment to each of the user terminals 21–23 immediately after the portion of the data is received. In this case, the time required for downloading the entire data to the plurality of user terminals is further reduced.

Further, steps 705–707 of the above embodiment may be modified as follows. The delivery server 1 divides the entire data into data fragments at step 705, and sequentially transmits the data fragments to the representative user terminal 21. During the download of the data from the delivery server 1, the representative user terminal 21 transmits every data fragment to each of the other user terminals 22, 23 immediately after the data fragment is received.

If the representative user terminal 21 cannot communicate with the delivery server 1 well via the WAN 5 in the above modification, the delivery server 1 may transmit all the data fragments which constitute the entire data to one of the other user terminals 22, 23 which can communicate with the delivery server 1 better than the representative user terminal 21. Then, the user terminal which has received all the data fragments transmits the received data fragments to all the other user terminals including the representative user terminal 21.

In the above embodiment, each of the user terminals 21–23 may severally start the mutual transmission immediately after the user terminal 21–23 completes the download of the assigned data fragments from the delivery server 1, even if all the user terminals 21–23 do not complete the download of the assigned data fragments yet. That is, step 707 may be started before step 706 is completed. Then, the total time required for downloading the entire data to the plurality of the user terminals is further reduced.

In the case that the one-to-one mutual transmission is performed as the above embodiment, the amount of the data exchanged between a pair of the user terminals at a time is often more than that of the data downloaded to each of the user terminals from the delivery server 1 especially at each of the stages after the first stage, even if the data fragments except the overlapping data fragments are only exchanged. Further, the contents of the split download maps of the user terminals are not consistent with one another in the middle of each stage of the mutual transmission as described above. For overcoming these drawbacks, one-to-multiple mutual transmission may be performed in the above embodiment instead of the one-to-one mutual transmission as follows.

Referring to FIG. 9, assuming that the six user terminals A–F have downloaded the respective group a–f of the data fragments, the data fragments 'a' are transmitted from the user terminal A to the other user terminals B–F at the first stage. The data fragments 'b' are transmitted from the user terminal B to the other user terminals A, C–F at the second stage. The data fragments 'c' are transmitted from the user terminal C to the other user terminals A, B, D–F at the third stage. The data fragments 'd' are transmitted from the user terminal D to the other user terminals A–C, E, F at the fourth stage. The data fragments 'e' are transmitted from the user terminal E to the other user terminals A–D, F at the fifth stage. The data fragments 'f' are transmitted from the user terminal F to the other user terminals A–E at the final stage.

Any user terminal must be able to communicate omnidirectionally with all the other user terminals within the download user network in order to perform the one-to-multiple mutual transmission. In the case of the one-to-multiple mutual transmission, high transmission efficiency is achieved because the data fragments are transmitted to a plurality of user terminals at a time. Further the contents of the split download maps of the user terminals A–F are kept consistent with one another at all times. Moreover only the same number of the data fragments as that downloaded to each of the user terminals A–F is transmitted at every stage. However, the communication should be performed the same number of times as that of the user terminals A–F.

In the above embodiment, the representative user terminal 21 does not have to notice the delivery server 1 of the new user terminal when the new user terminal joins the download user network 31 after the download acceptance signal is transmitted. That is, the new user terminal may obtain all the data fragments which constitute the entire data from the other user terminals 21–23 when the mutual transmission is performed among the user terminals 21–23.

Application of Embodiments to Delivery of Media Data

Figure 10:
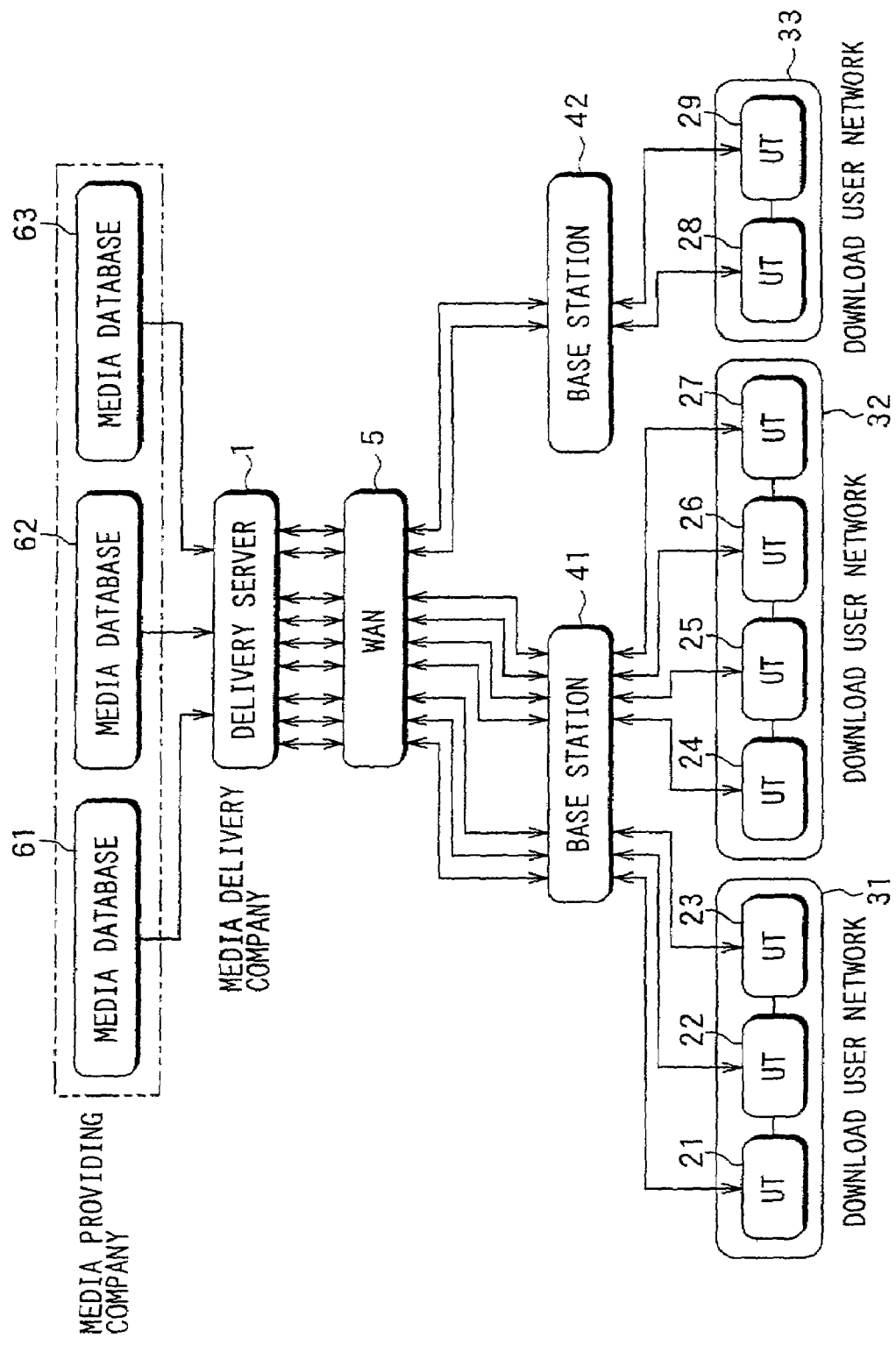
FIG. 10 is a block diagram showing a media data download system.
Figure 11:
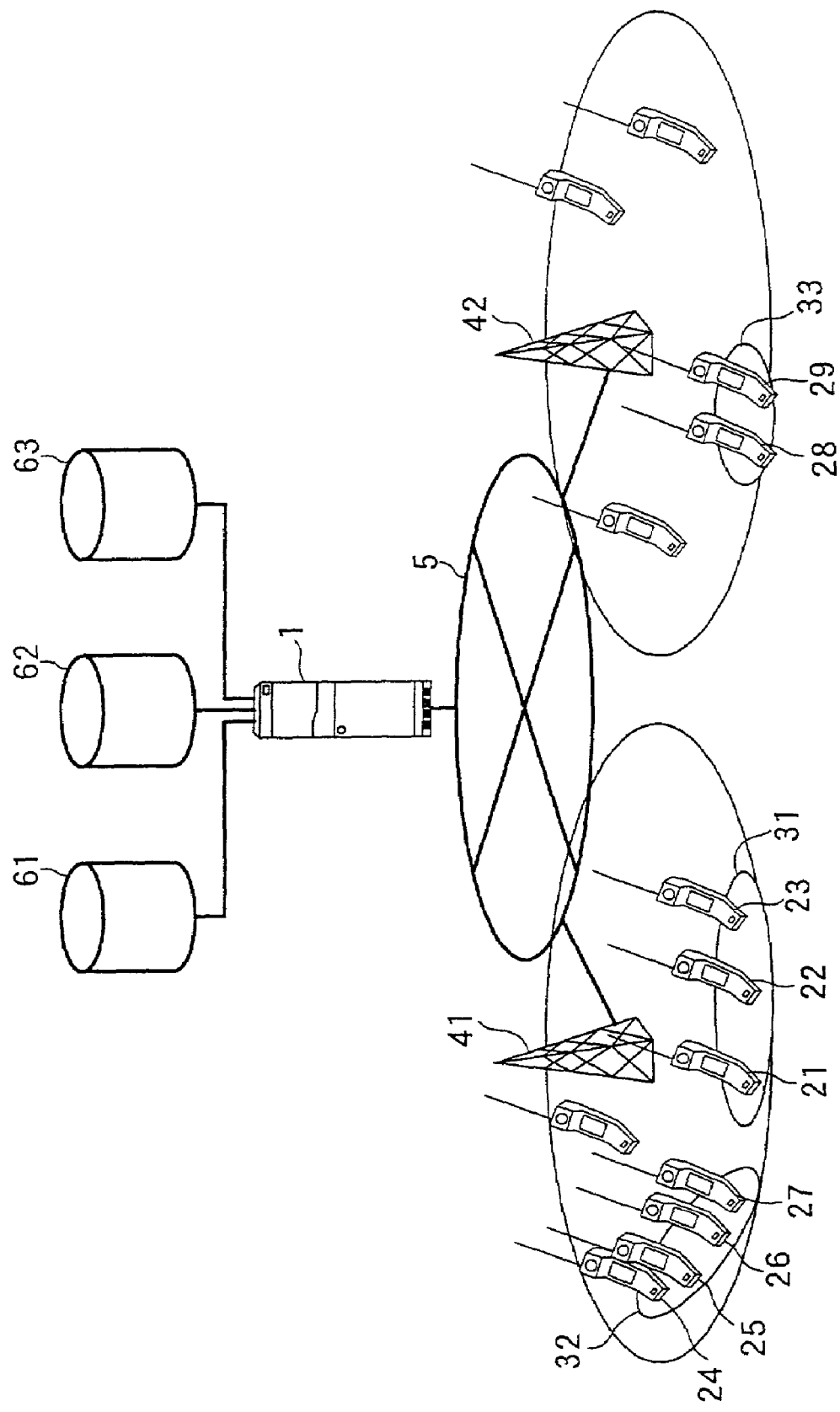
FIG. 11 is a pictorial diagram showing the media data download system of FIG. 10.

Various information can be downloaded to a plurality of user terminals according to the above embodiment or modifications. For example, media data such as music is downloaded as follows. Referring to FIGS. 10 and 11, a media providing company includes media databases 61, 62, 63 which store the media data. A media delivery company includes the delivery server 1 and communication equipment. The media providing company and the media delivery company need not to be separate, that is, they may be the same company.

Referring to FIG. 12, the media delivery company provides terminals and communications service. Users each purchase a terminal and make a contract with the media delivery company to subscribe to the communications service at step 801. The basic charge to be paid by the user is fixed at the time of the contract. The media delivery company cooperates with the media providing company at step 802. Then the media providing company provides the data to be delivered for the media delivery company. The media delivery company pays the media providing company for the data. The media delivery company provides information on media data to be delivered for the users. The users each select the data to be downloaded based on the information, and make a contract with the media delivery company to subscribe to the selected data at step 803.

Referring to FIG. 12B, the media delivery company provides information on the subscription for the media providing company as information on consumers' behavior at step 804, and the media providing company may give a discount off the price of the data in return. Then the discount given by the media providing company leads to reduction of the media rate to be paid by the user. The information on the consumers' behavior is reflected in marketing strategy in the media providing company.

The delivery server 1 receives data to be delivered from the media databases 61, 62, 63. Thereafter the delivery server 1 delivers the data according to the above embodiment or modifications at step 805. The accounting information on the delivered data is accumulated in the media delivery company when the data is delivered. The media delivery company bills the users for the delivered data and the communication, and the users each pay the bill at step 806.

In the case that the data is downloaded according to the above embodiment, the total charge F may be calculated based on the amount of the downloaded data using the following formula, for example:

$$F=\alpha f_{D1}D+\beta f_{D2}D/n$$

where 'n' is the number of user terminals among which the entire data is divided, 'D' is the amount of the entire data, '$f_{D1}$' is the charge (copyright royalty) for unit data, '$f_{D2}$' is the charge for communication of the unit data, '$\alpha$' is the discount rate for the data, and '$\beta$' is the discount rate for the communication. The first term '$\alpha f_{D1}D$' of the formula corresponds to the charge for the data, and the second term '$\beta f_{D2}D/n$' corresponds to the charge for the communication.

In the present media data download system, the media providing company has the merits of being capable of increasing the customers utilizing the sales network of the media delivery company and obtaining the information on the customers' behavior as described above. These merits are reflected in the charge for the data as the discount rate $\alpha$.

On the other hand, the media delivery company has the merit of being capable of increasing the number of the subscribers to the communication due to the increase in the number of the subscribers to the media data. Furthermore the media delivery company has the merit of efficient use of the communication equipment due to reduction in transmission time of the data. If the delivery of the data is performed during low-traffic hours, the efficiency in the use of the communication equipment is further improved. These merits are reflected in the charge for the communication as the discount rate $\beta$.

Moreover, assuming that the communication within the download user network is free of charge, the user has the merit of being charged less for the communication, because the charge for the communication '$\beta f_{D2}D$' is divided by the number 'n' of the user terminals in the above formula.

Alternatively, the total charge F may be calculated based on the amount of the downloaded data and the time taken for downloading the data using the following formula, for example:

$$F=\alpha f_{D1}D+\beta f_{t2}t/n$$

where 'n' is the number of user terminals among which the entire data is divided, 't' is the time taken for downloading the data, '$f_{D1}$' is the charge (copyright royalty) for unit data, '$f_{t2}$' is the charge for communication of the unit time, '$\alpha$' is the discount rate for the data, and '$\beta$' is the discount rate for the communication. The first term '$\alpha f_{D1}D$' of the formula corresponds to the charge for the data, and the second term '$\beta f_{t2}t/n$' corresponds to the charge for the communication.

When this charging system is employed, the time required for downloading the data from the delivery server 1, that is, the transmission rate should be the same in all the user terminals. If the transmission rate is not the same, the total charge for the same data varies from one user terminal to another.

A charging system other than the above charging systems may be employed. For example, the charge for the data is fixed, and the total charge may be calculated by adding the charge depending on the amount of the data and the charge depending on the time for downloading the data to the fixed charge for the data.

What is claimed is:

1. A download method for downloading data from a delivery server to a plurality of user terminals, comprising the steps of:

forming a download user network with the plurality of user terminals to download said data to the plurality of user terminals;

said delivery server dividing said data into a plurality of data portions, each of said plurality of data portions being assigned to a respective user terminal;

downloading each of said assigned data portions from said delivery server to each of said respective user terminals; and transmitting each of said plurality of data portions among said plurality of user terminals so that each of said plurality of user terminals receive said data by receiving each of said plurality of data portions.

2. A download method as in claim 1, wherein said dividing step is performed according to a number of said plurality of user terminals.

3. A download method as in claim 2, said forming step further comprising the steps of:

selecting one of said plurality of user terminals as a representative user terminal; and said representative user terminal transmitting information from which the number of said plurality of user terminals is obtained to said delivery server.

4. A download method as in claim 3, said forming step further comprising the steps of:

said representative user terminal gathering communication environment information on each of said plurality of said user terminals; and said representative user terminal transmitting said gathered communication environment information to said delivery server, wherein said dividing step is performed according to said communication environment information.

5. A download method as in claim 3, wherein said representative user terminal notifies said delivery server of an addition of a new user terminal to said download user network if said new user terminal joins said download network between completion of said forming step and beginning of said mutual transmitting step, wherein said delivery server redivides said data into a plurality of new data portions in response to the addition of said new user terminal so that said plurality of new data portions are reassigned to said new user terminal and said plurality of said user terminals, respectively, and wherein said downloading step is achieved by downloading said reassigned data portions from said delivery server to said new user terminal and said plurality of user terminals, respectively.

6. A download method as in claim 3, wherein a new user terminal obtains said plurality of data portions which constitute said data from said plurality of user terminals during said mutual transmitting step if said new user terminal joins said download user network between completion of said forming step and beginning of said mutual transmitting step.

7. A download method as in claim 3, wherein if one of said plurality of user terminals is disconnected from said delivery server between completion of said forming step and beginning of said mutual transmitting step, said delivery server redivides said data into a plurality of new data portions so that said plurality of new data portions are reassigned to said plurality of user terminals except said disconnected user terminal, and wherein said downloading step is achieved by downloading said plurality of reassigned data portions from said delivery server to said plurality of user terminals except said disconnected user terminal, respectively.

8. A download method as in claim 3, wherein said representative user terminals gives said plurality of user terminals an instruction to start the mutual transmitting step when said representative user terminal determines that said downloading step is completed in all of said plurality of user terminals, and wherein said mutual transmitting step is started simultaneously in all of said plurality of user terminals in response to said instruction.

9. A download method as in claim 4, wherein said dividing step is performed so that said data portions overlap each other according to said communication environment information.

10. A download method as in claim 1, wherein said mutual transmitting step is started severally in each of said plurality of user terminals when said downloading step is completed in the user terminal.

11. A download method as in claim 1, said dividing step further comprising the steps of:

generating a split download map including information on correspondence between said plurality of user terminals and said data portions assigned thereto; and attaching said split download map to each of said data portions, wherein said split download map is downloaded with each of said data portions to each of said plurality of user terminals in said downloading step.

12. A user terminal for downloading data from a delivery server comprising:

means for forming a download user network with at least one other user terminal to download said data to said user terminal and to said other user terminal;

means for downloading a first data portion of said data from a delivery server to said user terminal and a second data portion of said data to said other user terminal;

means for transmitting said first data portion to said other user terminal and receiving said second data portion of said data from said other user terminal; and means for combining said first and second data portions into said data at said user terminal and at said other user terminal.

13. A download system for downloading same data to a plurality of user terminals comprising:

a plurality of user terminals capable of forming a local area network; and a delivery server capable of communicating with said plurality of user terminals, wherein said data is divided into a plurality of data fragments and each of said plurality of data fragments are assigned to a respective user terminal; and wherein each of said plurality of user terminals downloads its respective assigned data fragment from said delivery server, and exchange said downloaded data fragments with one another via said local area network so that each of said plurality of user terminals obtains each of the plurality of data fragments of said data.

14. A download system as in claim 13, wherein said delivery server communicates with said plurality of user terminals via a wide area network.

* * * * *